(12) United States Patent
Burke et al.

(10) Patent No.: US 11,739,507 B2
(45) Date of Patent: Aug. 29, 2023

(54) TEST COCK WITH INTEGRATED EXTRACTION TOOL

(71) Applicant: Watts Regulator Co., North Andover, MA (US)

(72) Inventors: Joseph Michael Burke, Deerfield, NH (US); Kevin Simon, Somerville, MA (US)

(73) Assignee: Watts Regulator Co., North Andover, MA (US)

( * ) Notice: Subject to any disclaimer, the term of this patent is extended or adjusted under 35 U.S.C. 154(b) by 201 days.

(21) Appl. No.: 17/116,176

(22) Filed: Dec. 9, 2020

(65) Prior Publication Data
US 2022/0178118 A1 Jun. 9, 2022

(51) Int. Cl.
| | | |
|---|---|---|
| E03B 7/07 | (2006.01) | |
| F16K 27/06 | (2006.01) | |
| E03B 7/09 | (2006.01) | |
| F16L 15/08 | (2006.01) | |
| B25B 13/48 | (2006.01) | |

(52) U.S. Cl.
CPC ............. *E03B 7/095* (2013.01); *E03B 7/07* (2013.01); *F16K 27/067* (2013.01); *F16L 15/08* (2013.01); *B25B 13/48* (2013.01); *E03B 7/077* (2013.01)

(58) Field of Classification Search
CPC ......... F16K 27/067; B25B 13/48; E03B 7/07; Y10T 137/6109
USPC ........................................................ 285/39
See application file for complete search history.

(56) References Cited

U.S. PATENT DOCUMENTS

| | | |
|---|---|---|
| 213,394 A | 3/1879 | Cornwal |
| 2,310,586 A | 2/1943 | Lohman |
| 2,514,374 A | 7/1950 | Cooper |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,570,537 A | 3/1971 | Kelly |

(Continued)

FOREIGN PATENT DOCUMENTS

| | | |
|---|---|---|
| CN | 110081212 A | 8/2019 |
| DE | 1925477 A1 | 12/1970 |

(Continued)

OTHER PUBLICATIONS

International Search Report and Written Opinion issued in corresponding International Patent Application No. PCT/US2021/062395, dated Feb. 23, 2022, 14 pages.

(Continued)

*Primary Examiner* — Michael R Reid
(74) *Attorney, Agent, or Firm* — Day Pitney LLP; George N. Chaclas; Anthony A. Kassas (57) ABSTRACT

A test cock is configured to connect to a test cock port. The test cock includes a body portion defining a flowpath between a distal end and a proximal end. The test cock includes an intake stem at the proximal end that has external threads to connect the test cock to the test cock port. The intake stem defines an intake opening connected to the flowpath, the intake opening having a non-circular shape, such as a hexagonal shape. The test cock also includes an extraction tool having an end forming the non-circular shape of the intake opening, the end being sized to fit within and engage the intake opening.

18 Claims, 9 Drawing Sheets

(56) References Cited

U.S. PATENT DOCUMENTS

| | | |
|---|---|---|
| 3,817,278 A | 6/1974 | Elliott |
| 3,837,357 A | 9/1974 | Slaughter |
| 3,837,358 A | 9/1974 | Zieg et al. |
| 3,859,619 A | 1/1975 | Ishihara et al. |
| 3,896,850 A | 7/1975 | Waltrip |
| 3,905,382 A | 9/1975 | Waterston |
| 3,906,987 A | 9/1975 | Rushforth et al. |
| 3,996,962 A | 12/1976 | Sutherland |
| 4,014,284 A | 3/1977 | Read |
| 4,244,392 A | 1/1981 | Griswold |
| 4,284,097 A | 8/1981 | Becker et al. |
| 4,416,211 A | 11/1983 | Hoffman |
| 4,453,561 A | 6/1984 | Sands |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,694,859 A | 9/1987 | Smith |
| 4,776,365 A | 10/1988 | Bathrick et al. |
| 4,777,979 A | 10/1988 | Twerdochlib |
| 4,920,802 A | 5/1990 | Mcmullin et al. |
| 4,945,940 A | 8/1990 | Stevens |
| 5,008,841 A | 4/1991 | Mcelroy |
| 5,024,469 A | 6/1991 | Aitken et al. |
| 5,072,753 A | 12/1991 | Ackroyd |
| 5,125,429 A | 6/1992 | Ackroyd et al. |
| 5,236,009 A | 8/1993 | Ackroyd |
| 5,299,718 A | 4/1994 | Shwery |
| 5,404,905 A | 4/1995 | Lauria |
| 5,425,393 A | 6/1995 | Everett |
| 5,452,974 A * | 9/1995 | Binns .................... F16B 39/025 411/3 |
| 5,520,367 A | 5/1996 | Stowers |
| 5,551,473 A | 9/1996 | Lin et al. |
| 5,566,704 A | 10/1996 | Ackroyd et al. |
| 5,584,315 A | 12/1996 | Powell |
| 5,586,571 A | 12/1996 | Guillermo |
| 5,669,405 A | 9/1997 | Engelmann |
| 5,711,341 A | 1/1998 | Funderburk et al. |
| 5,713,240 A | 2/1998 | Engelmann |
| 5,901,735 A | 5/1999 | Breda |
| 5,918,623 A | 7/1999 | Hidessen |
| 5,947,152 A | 9/1999 | Martin et al. |
| 5,992,441 A | 11/1999 | Enge et al. |
| 6,123,095 A | 9/2000 | Kersten et al. |
| 6,155,291 A | 12/2000 | Powell |
| 6,170,510 B1 | 1/2001 | King et al. |
| 6,234,180 B1 | 5/2001 | Davis et al. |
| 6,343,618 B1 | 2/2002 | Britt et al. |
| 6,349,736 B1 | 2/2002 | Dunmire |
| 6,374,849 B1 | 4/2002 | Howell |
| 6,378,550 B1 | 4/2002 | Herndon et al. |
| 6,443,184 B1 | 9/2002 | Funderburk |
| 6,471,249 B1 | 10/2002 | Lewis |
| 6,513,543 B1 | 2/2003 | Noll et al. |
| 6,546,946 B2 | 4/2003 | Dunmire |
| 6,581,626 B2 | 6/2003 | Noll et al. |
| 6,659,126 B2 | 12/2003 | Dunmire et al. |
| 6,675,110 B2 | 1/2004 | Engelmann |
| 7,051,763 B2 * | 5/2006 | Heren .................... F16K 27/067 137/883 |
| 7,114,418 B1 | 10/2006 | Allen |
| 7,434,593 B2 | 10/2008 | Noll et al. |
| 7,506,395 B2 | 3/2009 | Eldridge |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm |
| 9,539,400 B2 | 1/2017 | Gumaste et al. |
| 9,546,475 B2 | 1/2017 | Lu |
| 9,899,819 B1 | 2/2018 | Holloway |
| 9,995,605 B2 | 6/2018 | Konno et al. |
| 10,132,425 B2 | 11/2018 | Monte |
| 10,561,874 B2 | 2/2020 | Williams et al. |
| 10,719,904 B2 | 7/2020 | Yasumuro et al. |
| 10,883,893 B2 | 1/2021 | Shaw et al. |
| 10,914,412 B2 | 2/2021 | Doughty et al. |
| 10,962,143 B2 | 3/2021 | Cis et al. |
| 11,137,082 B2 | 10/2021 | Okuno et al. |
| 2002/0043282 A1 | 4/2002 | Horne et al. |
| 2002/0078801 A1 | 6/2002 | Persechino |
| 2003/0000577 A1 | 1/2003 | Noll et al. |
| 2003/0168105 A1 | 9/2003 | Funderburk |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0076062 A1 | 4/2006 | Andersson |
| 2006/0196542 A1 | 9/2006 | Yen |
| 2007/0181191 A1 | 8/2007 | Wittig et al. |
| 2007/0193633 A1 | 8/2007 | Howell et al. |
| 2007/0204916 A1 | 9/2007 | Clayton et al. |
| 2007/0204917 A1 | 9/2007 | Clayton et al. |
| 2007/0240765 A1 | 10/2007 | Katzman et al. |
| 2008/0289567 A1 | 11/2008 | Gordon |
| 2009/0136935 A1 | 5/2009 | Petersen |
| 2009/0194719 A1 | 8/2009 | Mulligan |
| 2011/0067225 A1 | 3/2011 | Bassaco |
| 2011/0309076 A1 | 12/2011 | Liebenberg et al. |
| 2012/0248759 A1 | 10/2012 | Feith |
| 2013/0026743 A1 | 1/2013 | Baca |
| 2013/0255452 A1 | 10/2013 | Kovach |
| 2017/0023141 A1 | 1/2017 | Andersson |
| 2018/0156488 A1 | 6/2018 | Stanley et al. |
| 2019/0043157 A1 | 2/2019 | Yasumuro et al. |
| 2019/0136935 A1 | 5/2019 | Hulstein et al. |
| 2019/0162341 A1 | 5/2019 | Chiproot |
| 2019/0271428 A1 | 9/2019 | O'Connor et al. |
| 2019/0323618 A1 | 10/2019 | Fletcher et al. |
| 2020/0141612 A1 | 5/2020 | Thibodeaux |
| 2020/0370677 A1 | 11/2020 | Mendez |
| 2021/0172157 A1 | 6/2021 | Burke et al. |
| 2021/0230850 A1 | 7/2021 | Bouchard et al. |
| 2021/0332898 A1 | 10/2021 | Cellemme |

FOREIGN PATENT DOCUMENTS

| | | |
|---|---|---|
| DE | 8525261 U1 | 11/1985 |
| DE | 202014102566 U1 | 8/2014 |
| DE | 202014102568 U1 | 9/2015 |
| EP | 3434833 A1 | 1/2019 |
| EP | 3832183 A1 | 6/2021 |
| JP | 2002213629 A | 7/2002 |
| WO | 2003060459 A1 | 7/2003 |
| WO | 2020023584 A1 | 1/2020 |

OTHER PUBLICATIONS

Lead Free Master Series LF870V product specifications pages, ES-F-LF-870V 1826, 2018, 4 pages.
Watt TK-99E Backflow Preventer Test Kit Product Specifications and Test Information, IS-TK99E 0829, 2009, 4 pages.
Watts Water Technologies Company, Installation, Maintenance & Repair Series 909, LF909, 909RPDA, LF909RPDA, 2016, 8 pages.
Watts Water Company, Series 909RPDA for Health Hazard Applications, 2016, 4 pages.
Watts Regulator Co., WATTS ACV 113-6RFP Flood Protection Shutdown Valve for Health Hazard Applications, 2020, 4 pages.
European Search Report for European Patent Application No. 20192133.5 dated Feb. 1, 2021, 9 pages.
Ames Fire & Waterworks, division of Watts Industries, F-A-Spools/ Flanges, 2001, 4 pages.
Watts, S-RetroFit-Simple, 2017, 2 pages.
*Zurn Industries, LLC vs. Conbraco Industries, Inc.*, Complaint for patent infringement, United States District Court for the Center District of California Western Division, Case No_ 2.16-CV-5656, Jul. 29, 2016; 5 pages.
Wilkins Company, Model 375/475MS Series, Installation, Maintenance and Instruction Sheet, 2006, 1 page.
Apollo Valves PVB4A Series Installation, Operation and Maintenance Manual for Model PVB4A ½"-2" Pressure Vacuum Breaker Backflow Preventer, dated Jan. 11, 2012, 12 pages.

(56) References Cited

OTHER PUBLICATIONS

Apollo Valves PVB4A Series Installation, Operation, and Maintenance Manual, copyright May 2009, 9 pages.
Watts Water Technologies Company Brochure ES LF800M4QT for Health Hazard Applications Lead Free Series LF8 M4QT Anti-Siphon Vacuum Breakers Sizes ½"-2", copyright 2013, 4 pages.
Watts, "Double Check Valve Assembly Backflow Preventers, Bronze," Article 1, 2021, 6 pages.
Watts, "Reduced Pressure Zone Assembly Backflow Preventers, Bronze Body, Sizes ¼-2 IN," Article 1, 2021, 16 pages.
Miscellaneous Communication issued in European patent application No. 20211811.3, dated Apr. 5, 2021, 8 pages.
Office Action issued in corresponding Chinese patent application No. 20201920527.3, dated Mar. 10, 2021, 1 page (translation unavailable).
International Search Report and Written Opinion issued in corresponding international patent application No. PCT/JS2021/046208, dated Dec. 1, 2021, 8 pages.
International Search Report and Written Opinion issued in corresponding International Patent Application No. PCT/US2021/046101, dated Nov. 22, 2021, 8 pages.
Extended European Search Report received for European Patent Application No. 20211811.3, dated May 4, 2021, 2 pages.
Apollo Valves, Apollo backflow preventer in-line "R" retrofit series, (date unknown) 2 pages, Dated Dec. 2018.
Donbraco BFMMPVB Maintenance Manual for Series 4V-500 ½"-2" Pressure Type Vacuum Breaker, (Apr. 2002), Conbraco Industries, Inc., Matthews, North Carolina 28106, 6 pages.
Wilkins Model 420 XL Lead-Free pressure Vacuum Breakers ½", ¾", and 1", (date unknown) pp. 60-70, Dated Oct. 2020.
Zurn Wilkins 300AR Series, Backflow Preventor Order Form No. 480-060, (Apr. 2017); 2 pages.

* cited by examiner

TEST COCK WITH INTEGRATED EXTRACTION TOOL

FIELD OF THE TECHNOLOGY

The subject disclosure relates to tools for testing water systems, and more particularly to test cocks.

BACKGROUND OF TECHNOLOGY

Water systems often allow for testing at certain areas of the system. To that end, water systems can include test cock connection ports which allow test cocks to connect to the system. Test cocks can include gauges or sensors to measure characteristics at a given port connection. In particular, test cocks are often used around valves, such as backflow prevention valves, to ensure that the valves are operating properly.

Often, test cocks connect to a port via a small threaded stem. When it is time to remove the test cock, these stems sometimes break, leaving the end of the stem lodged in the port with no easy way to unscrew the stem. This can result in a long and tedious manual extraction process. Therefore, there is a need for a test cock designed such that the stem can be easily extracted from a test cock port should it break off while lodged therein.

SUMMARY OF THE TECHNOLOGY

In light of the needs described above, in at least one aspect, the subject technology relates to a test cock configured to connect to a test cock port. The test cock includes a body portion defining a flowpath between a distal end and a proximal end. The test cock also includes an intake stem at the proximal end having external threads configured to connect the test cock to the test cock port. The intake stem defines an intake opening connected to the flowpath. The intake opening has a non-circular shape.

In some embodiments, the test cock includes an extraction tool. The extraction tool has an end forming the non-circular shape of the intake opening, the end being sized to fit within and engage the intake opening. The body portion of the test cock can include a sidewall and the extraction tool can be integrally formed as part of the sidewall such that the end of the extraction tool protrudes from the sidewall. In some cases, the end of the extraction tool protrudes from the sidewall orthogonal to the flowpath.

In some embodiments, the non-circular shape of the intake opening and the end of the extraction tool are both a hexagonal shape. In some cases, the non-circular shape of the intake opening and the end of the extraction tool are both a double-hex socket shape. In some cases, the non-circular shape of the intake opening and the end of the extraction tool are both a polydrive socket shape. In some embodiments, the non-circular shape of the intake opening and the end of the extraction tool are a pentalobular shape. In some cases, the non-circular shape of the intake opening and the end of the extraction tool are a spline socket shape. In some embodiments the non-circular shape of the intake opening and the end of the extraction tool are a torx socket shape.

In some embodiments the flowpath is also the non-circular shape. In some cases, the test cock includes a ball valve arranged such that actuation of the ball valve towards a closed position restricts flow along the flowpath.

In at least one aspect, the subject technology relates to a test cock configured to connect to a test cock port. The test cock has a body portion defining a flowpath between a distal end and a proximal end. The test cock includes an intake stem at the proximal end having external threads configured to connect the test cock to the test cock port. The intake stem defines an intake opening connected to the flowpath, the intake opening having a hexagonal shape. The test cock includes an extraction tool, the extraction tool having an end forming the hexagonal shape of the intake opening. The end of the extraction tool is sized to fit within and engage the intake opening.

In some embodiments, the body portion includes a sidewall. The extraction tool can be integrally formed as part of the sidewall such that the end of the extraction tool protrudes from the sidewall. In some cases, the end of the extraction tool protrudes from the sidewall orthogonal to the flowpath. In some cases, the flowpath has the hexagonal shape. In some embodiments, the test cock includes a ball valve arranged such that actuation of the ball valve towards a closed position restricts flow along the flowpath.

BRIEF DESCRIPTION OF THE DRAWINGS

So that those having ordinary skill in the art to which the disclosed system pertains will more readily understand how to make and use the same, reference may be had to the following drawings.

FIGS. 3-4 are perspective views of the TC of FIG. 2a.

FIG. 5 is a bottom view of the TC of FIG. 2a.

FIG. 6a is a right side view of the TC of FIG. 2a.

FIG. 6b is a vertical cross section taken from section line B-B of FIG. 6a.

DETAILED DESCRIPTION

The subject technology overcomes many of the prior art problems associated with extraction of broken test cocks from water systems. In brief summary, the subject technology provides a test cock with a stem which can be easily extracted using an integrated extraction tool should it break off within a test cock port. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

Figure 1:
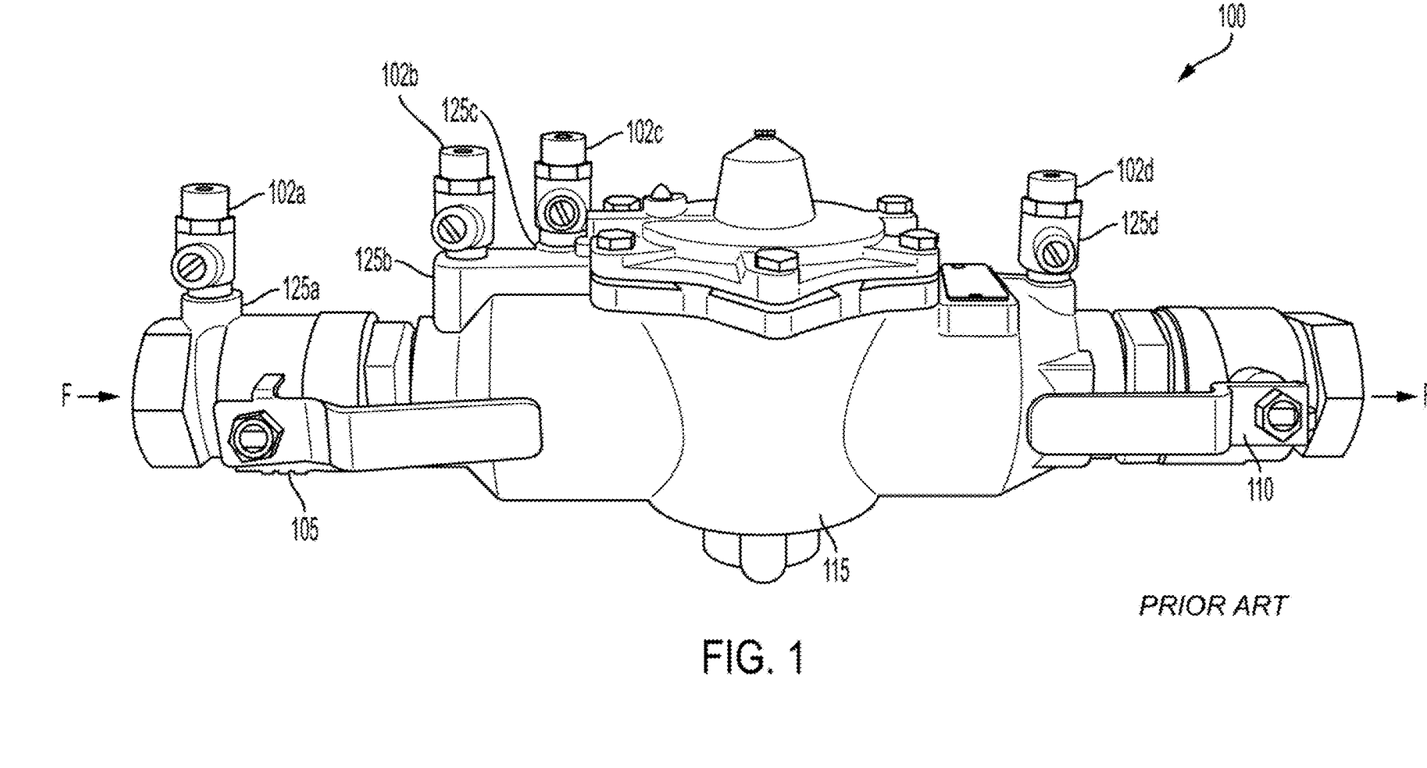
FIG. 1 is a front perspective view of a backflow preventer for a water system with a number of test cocks (TCs).

Referring now to FIG. 1, a typical backflow preventer (BFP) 100 includes an inlet shutoff valve 105 and an outlet shutoff valve 110 with a backflow prevention valve 115 positioned between the inlet and outlet shutoff valves where the forward flow direction F is shown. It is noted that many different configurations of backflow prevention assemblies are commercially available, each being different in configuration, and the BFP 100 presented here is merely an example. To facilitate testing, the BFP 100 includes a number of test cocks (TCs) 102*a*-102*d* (generally 102), each of which is threadably connected to couple with a fluid path within the BFP 100 via a corresponding TC port 125*a*-125*d* (generally 125) on the BFP 100. There are, in the most common implementation, four TCs 102 located on the BFP 100 in order to allow for temporarily attaching measuring equipment to measure the flow to ensure that the BFP 100 is functioning correctly.

Figure 2A:
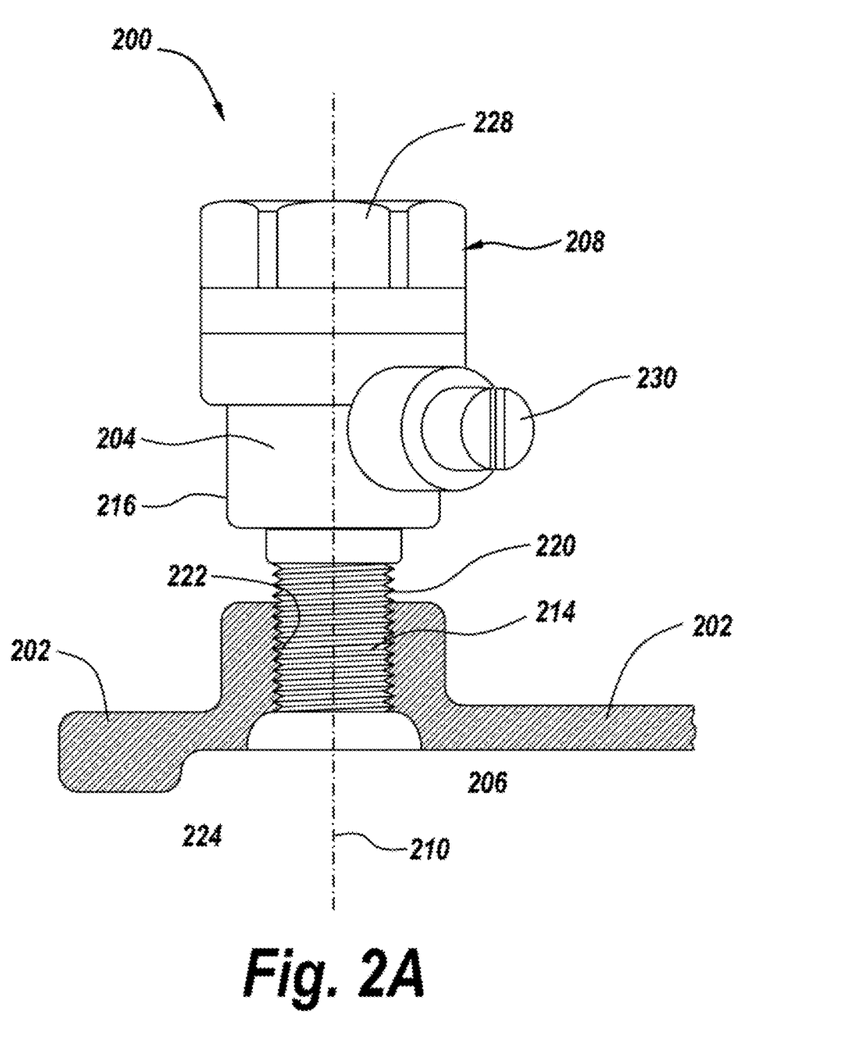
FIG. 2a is front-left side view of a TC fitted within a TC port in accordance with the subject technology.

Referring now to FIGS. 2*a*-7, a TC 200 in accordance with the subject technology is shown. FIGS. 2*a*-2*b* show the TC 200 secured within a TC port 202 similar to the TC ports 125, while FIGS. 3-6*b* show the TC 200 isolated. It should be understood that while a TC port 125 on the BFP 100 is used by way of example, the TC 200 can be used within most known TC ports which allow for a connection via a threaded port. Use of the TC 200 is therefore not limited to use within a TC port for a BFP. The TC 200 can be used in connection with other types of valves, or other areas of a water transmission system where a connection is required for testing.

The TC 200 includes an elongated body 204 between a proximal end 206 and a distal end 208. The body 204 has a stepped, generally cylindrical exterior 216, while the interior 218 defines a flowpath 212 (see FIG. 6*b*) along a vertical axis 210 between the proximal and distal ends 206, 208. The proximal end 206 forms an intake stem 214 which is designed to connect the TC 200 to the TC port 202 and accept water into the TC 200. As such, the stem 214 has a threaded exterior 220 which is designed to engage the threaded interior 222 of the TC port 202. The stem 214 defines an opening 224 which leads to the flowpath 212, the flowpath 212 directing water flow to an outlet 226 through the distal end 208. When not in use, the distal end 208 is sealed by a cap 228. The TC 200 also has a ball valve 230 which can be actuated to allow or restrict flow along the flowpath 212. In particular, actuation of the ball valve 230 towards a closed position will restrict flow along the flowpath 212.

Figure 2B:
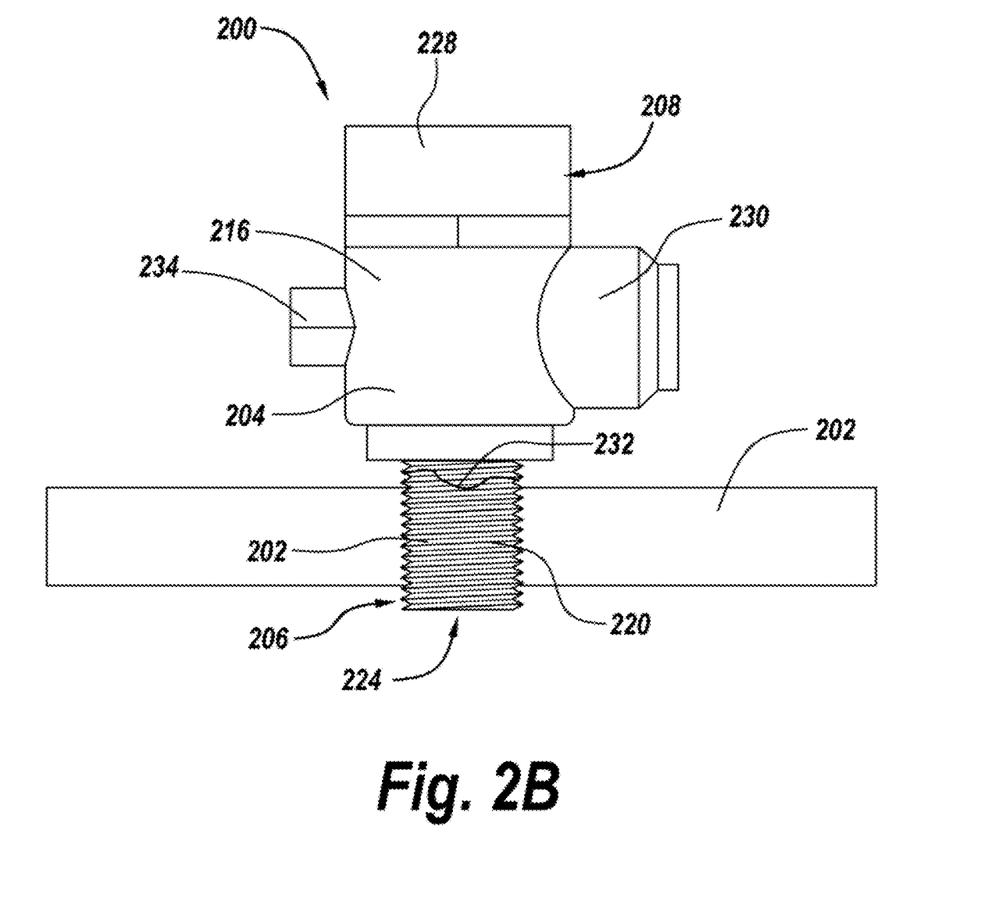
FIG. 2b is a front view of the TC of FIG. 2a with the stem of the TC exhibiting a break line.
Figure 3:
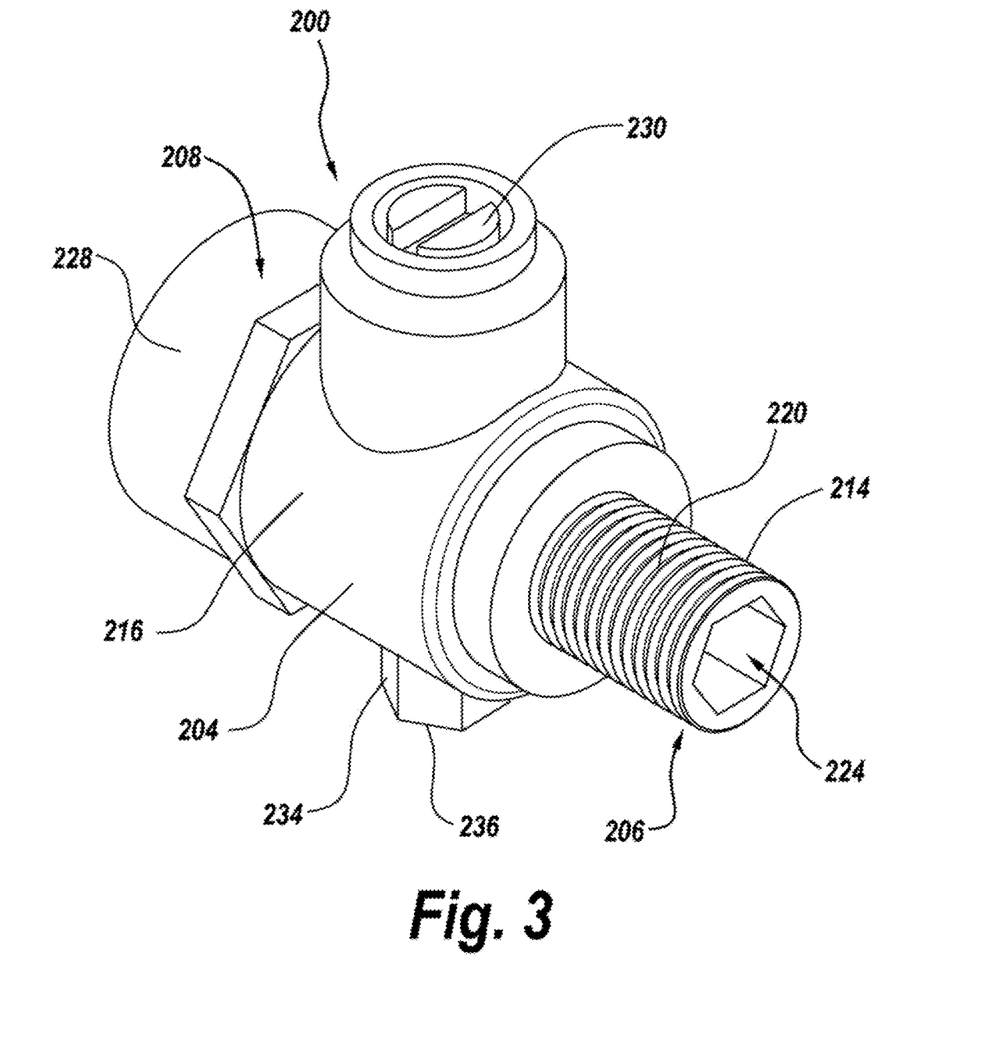
Figure 4:
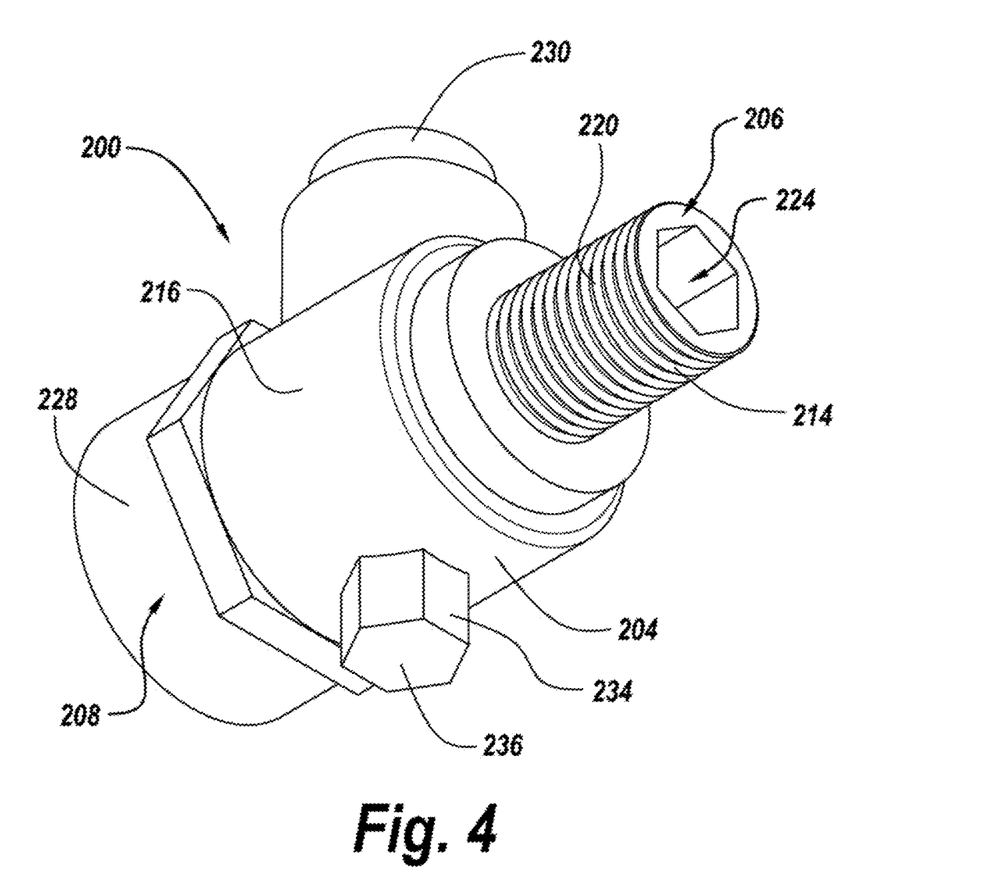
Figure 7:
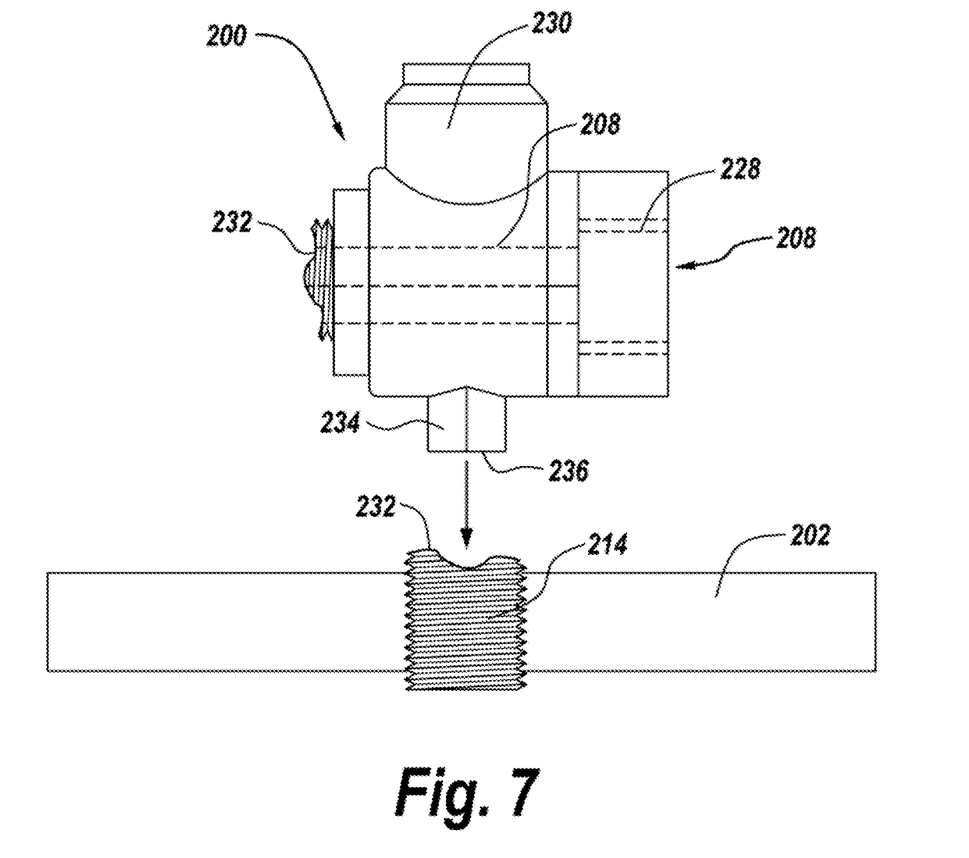
FIG. 7 is front view of the TC of FIG. 2b showing the TC after the body and stem have separated along the break line.
Figure 8A:
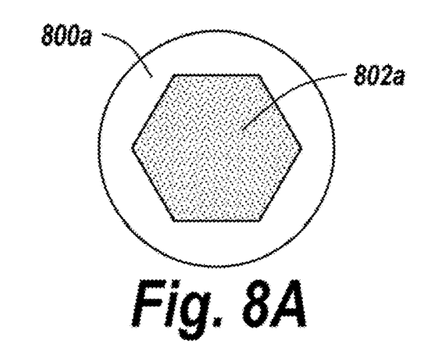
FIGS. 8a-8g are bottom views of exemplary stems for a TC in accordance with the subject technology.
Figure 8B:
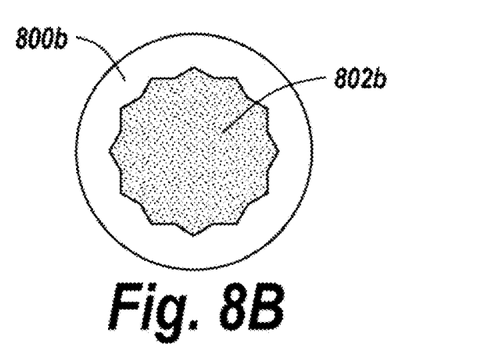
Figure 8C:
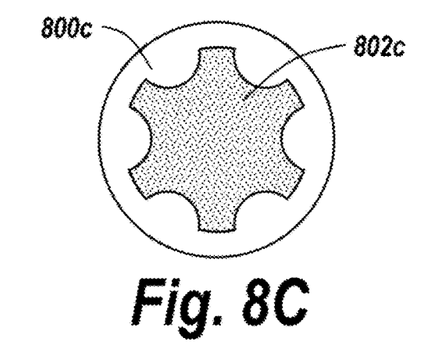
Figure 8D:
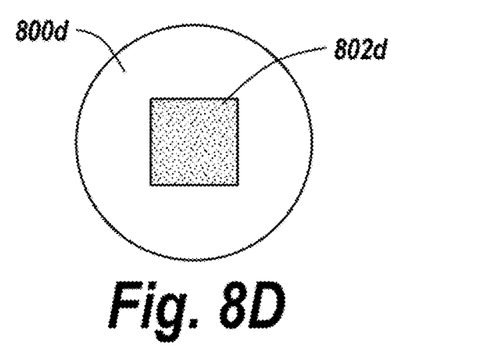
Figure 8E:
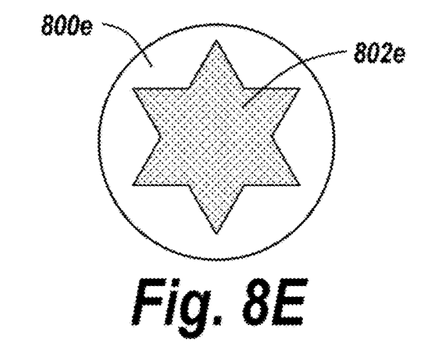
Figure 8F:
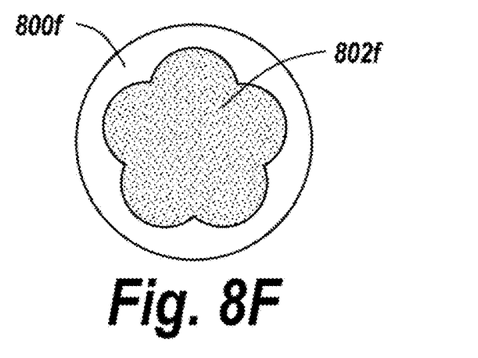
Figure 8G:
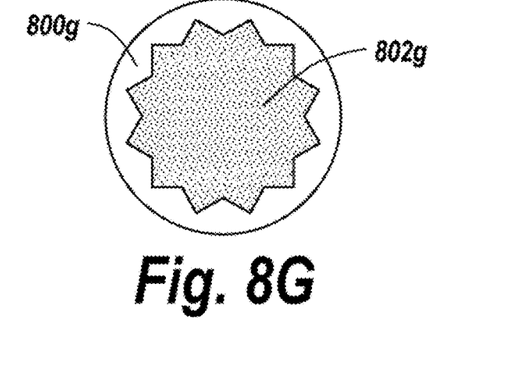

The stem 214 of the TC 200 is often thin as compared to the body 204 of the TC 200 to allow the proximal end 206 to fit within a TC port 202 without unduly restricting flow. Thus, it is common for the stem 214 to break off during removal of the TC 200, leaving much of the stem 214 lodged within the TC port 202. In particular, FIG. 2*b* shows an exemplary break line 232 across the stem 214 of the TC 200 while FIG. 7 shows the TC 200 after a break during removal. The break in FIG. 7 causes the stem 214 to be left within the TC port 202 after the body 204 has been moved away. Ordinarily, the broken stem 214 would be extremely difficult to extract, and could require significant time and effort on the part of a technician.

Figure 5:
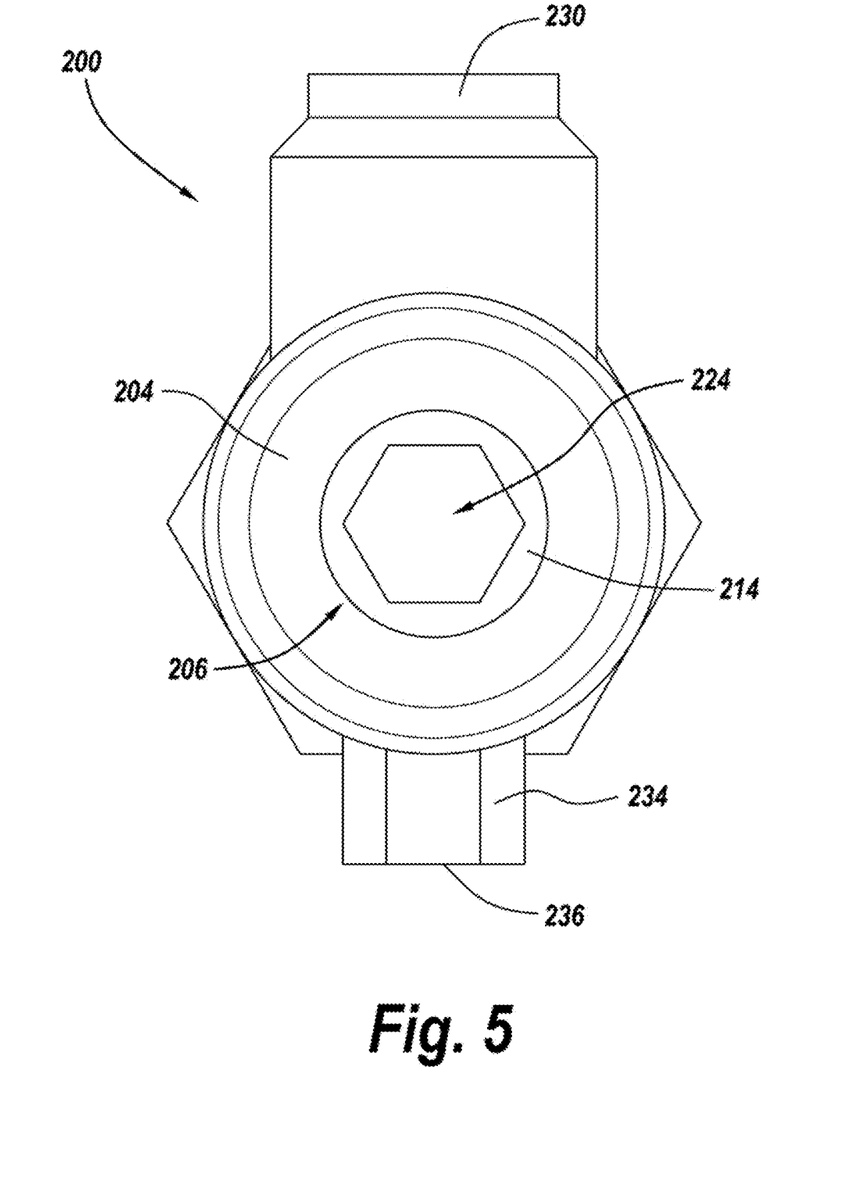
Figure 6A:
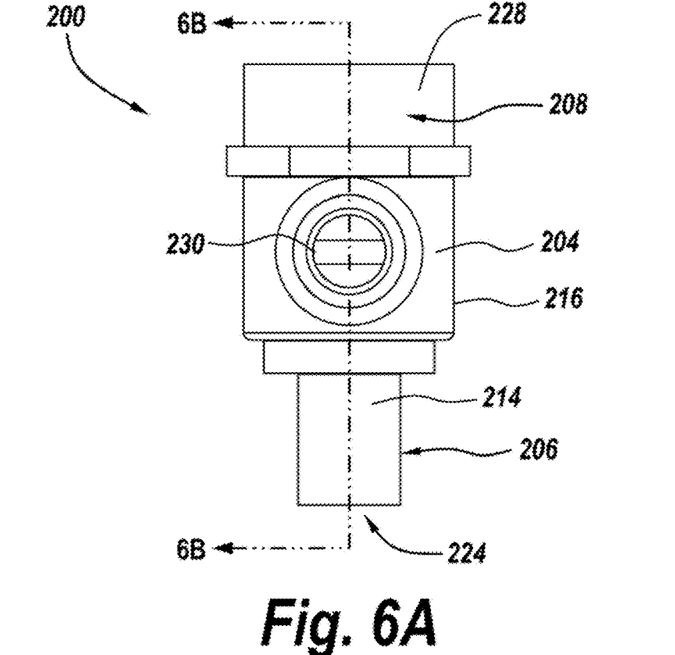
Figure 6B:
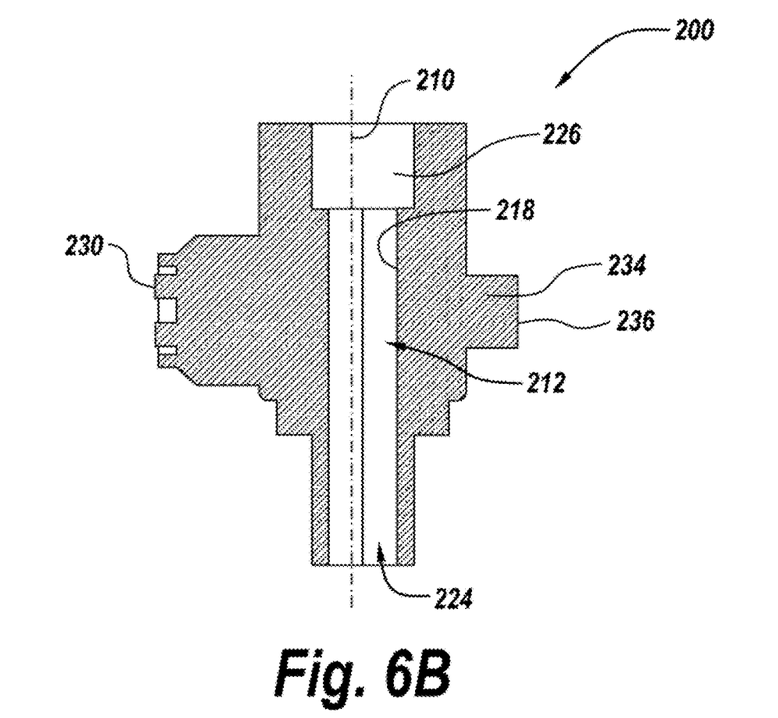

In the present example, the TC 200 includes a modified opening 224 and integrated extraction tool 234 which allow for the easy extraction of broken stems 214. As best seen in FIG. 5, the stem opening 224 is hexagonal in shape, which can be engaged by a similarly shaped tool. The hexagonal shape continues throughout the length of the stem 214, and in some cases, throughout the flowpath 212 of the body 204. Therefore, if the stem 214 breaks off within the TC port 202, a similarly shaped hexagonal tool can be inserted into the hexagonal opening 224 within the stem 214 and rotated to unscrew the broken stem 214 from the TC port 202. The TC 200 therefore includes an extraction tool 234 with a hexagonally shaped end 236 which compliments the hexagonal opening 224. In particular, the end 236 of the extraction tool is has the same hexagonal shape as the opening 224, and it is sized to be small enough to fit within the opening 224 while still being large enough that the exterior of the end 236 couples with the interior of the opening 224. In some cases, the entire extraction tool 234 can be the hexagonal shape.

The extraction tool 234 is integrally formed with the sidewall of the body 204 of the TC 200 on an opposite side of the ball valve 230. The extraction tool 234 is designed to protrude from the body 204 horizontally, at a 90 degree angle (i.e. orthogonal to the vertical axis 210). When the stem 214 breaks, the stem 214 and the body 204 are separated and the extraction tool 234 can be moved separately from the stem 214. Therefore, the extraction tool 234 can be turned sideways, as shown in FIG. 7, and the end 236 can then be inserted into the opening 224 of the broken stem 214. Once inserted, the edges of the hexagonal end 236 engage the interior edges of the opening 224 within the stem 214. The body 204 can then be rotated around the vertical axis 210, the hexagonal end 236 turning the stem 214 as the body 204 turns. Since the stem 214 is connected to the TC port 202 via threads 220, 222, rotation of the stem 214 in the correct direction (e.g. counter-clockwise) will cause the stem 214 to disengage from the TC port 202. In this way, turning the body 204 can force the broken stem 214 to disengage from the TC port 202, allowing the broken stem 214 to be easily extracted from the TC port 202 via a simple turning motion.

The end 236 of the extraction tool 234 will usually be shaped and sized to fit within at least the opening of the stem 214. In some cases, the flowpath 210 through the entire body 204 can be of a similar shape and size. While a hexagonal shaped opening 224, flowpath 210, and extraction tool end 236 are shown in FIGS. 2*a*-7 by way of example, it should be understood that other non-circular shapes can also be used, so long as the extraction tool 234 can engage the interior of the opening 224 and turn the broken stem 214. In particular, other non-circular shapes may be used, which allow for the edges of the extraction tool 234 to engage the interior edges of the stem 214 to allow for the necessary rotation.

To that end, referring now to FIGS. 8*a*-8*g*, exemplary stems 800*a*-800*g* (generally 800) with openings 802*a*-802*g* (generally 802) of different shapes are shown. It should be understood that while only a bottom view of each stem 800 is shown in FIGS. 8*a*-8*g*, the stems 800 can be configured similarly to the stem 214, except as otherwise described herein. Further, the stems 800 can be incorporated as part of the TC 200, except as otherwise described herein.

The shape of the end 236 of the extraction tool 234 for a given TC 200 will be dependent on the shape of the opening 224 within the stem 214. The end 236 of the extraction tool 234 will always be shaped and sized to fit within, and engage, the opening 224 of the stem 214 on a given TC 200. Therefore, for TCs 200 having a stem 214 with an opening 802 of one of the shapes shown in FIGS. 8*a*-8*g*, it should be understood that the extraction tool 234 would likewise include an end 236 of the same shape. Similarly the opening 802 shapes shown in FIGS. 8*a*-8*g* are advantageous in that they correspond to the shapes of common non-round drivers. Thus, even if no extraction tool is integrated within the TC 200, the stems 800 it may still be possible to extract the stems 800 with readily available tools carried by a technician.

Referring to FIGS. 8a-8g, the stem 802a includes a hexagonal shaped opening 802a, similar to the opening 224 of the stem 214. The hexagonal shaped opening 802a is suitable to be engaged with a standard hex driver, in the event the corresponding TC does not include an integrated extraction tool. The other openings 802b-802g likewise include shapes that correspond to standard driver shapes. In particular, the opening 802b has a double-hex shape while the opening 802c has a polydrive shape, suitable for corresponding drivers. The double hex opening, 802b, has the benefit of an improved flow-path size, while retaining operability with the common hex drive. The opening 802d has a square shape, suitable for a square, or Robertson driver. The opening 802e is a torx shape, or 6-pointed star, suitable for a corresponding torx driver. The opening 802f is a pentalobular shape, and the opening 802g is a spline shape-both suitable for corresponding drivers of the same shape, as are known. However, to eliminate the need for a separate driver altogether, it should be understood that the stems 800 can be included as part of a TC with an integrated extraction tool corresponding to the shape of the opening 802a. In this way, the stem 800 can always be easily extracted should the TC 200 break, without the need for additional tools or significant labor.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A test cock configured to connect to a test cock port, comprising:
a body portion defining a flowpath between a distal end and a proximal end;
an intake stem at the proximal end having external threads configured to connect the test cock to the test cock port, the intake stem defining an intake opening connected to the flowpath, the intake opening having a non-circular shape; and
an extraction tool, the extraction tool having an end for the non-circular shape of the intake opening, the end being sized to fit within and engage the intake opening, wherein the extraction tool is part of the body portion of the test cock, the end of the extraction tool protruding from the body portion.

2. The test cock of claim 1, wherein the end of the extraction tool protrudes from the sidewall orthogonal to the flowpath.

3. The test cock of claim 2, wherein the non-circular shape of the intake opening and the end of the extraction tool are both a hexagonal shape.

4. The test cock of claim 2, wherein the non-circular shape of the intake opening and the end of the extraction tool are both a double-hex socket shape.

5. The test cock of claim 2, wherein the non-circular shape of the intake opening and the end of the extraction tool are both a polydrive socket shape.

6. The test cock of claim 2, wherein the non-circular shape of the intake opening and the end of the extraction tool are a pentalobular shape.

7. The test cock of claim 2, wherein the non-circular shape of the intake opening and the end of the extraction tool are a spline socket shape.

8. The test cock of claim 2, wherein the non-circular shape of the intake opening and the end of the extraction tool are a torx socket shape.

9. The test cock of claim 1, wherein the flowpath is the non-circular shape.

10. The test cock of claim 1, wherein the test cock includes a ball valve arranged such that actuation of the ball valve towards a closed position restricts flow along the flowpath.

11. The test cock of claim 1, wherein extraction tool extends from a sidewall of the body portion.

12. The test cock of claim 11, wherein the extraction tool is integrally formed as part of the body portion.

13. A test cock configured to connect to a test cock port, comprising:
a body portion defining a flowpath between a distal end and a proximal end;
an intake stem at the proximal end having external threads configured to connect the test cock to the test cock port, the intake stem defining an intake opening connected to the flowpath, the intake opening having a hexagonal shape; and
an extraction tool, the extraction tool having an end forming the hexagonal shape of the intake opening, the end being sized to fit within and engage the intake opening,
wherein the extraction tool is part of the body portion, the end of the extraction tool protruding from the body portion.

14. The test cock of claim 13, wherein the end of the extraction tool protrudes from the sidewall orthogonal to the flowpath.

15. The test cock of claim 13, wherein the flowpath has the hexagonal shape.

16. The test cock of claim 13, wherein the test cock includes a ball valve arranged such that actuation of the ball valve towards a closed position restricts flow along the flowpath.

17. The test cock of claim 13, wherein extraction tool extends from a sidewall of the body portion.

18. The test cock of claim 17, wherein the extraction tool is integrally formed as part of the body portion.

* * * * *